March 29, 1960
R. EMEIS
2,930,098
PRODUCTION OF SINTERED BODIES FROM
POWDERED CRYSTALLINE MATERIALS
Filed June 23, 1955
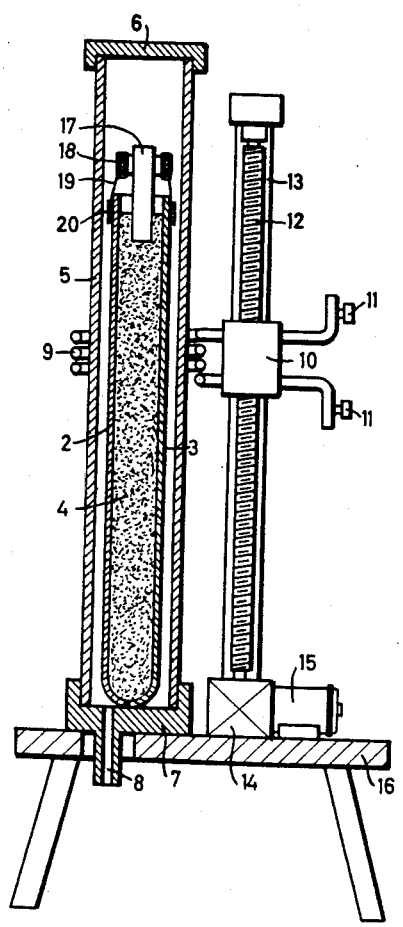

United States Patent Office 2,930,098
Patented Mar. 29, 1960

2,930,098

PRODUCTION OF SINTERED BODIES FROM POWDERED CRYSTALLINE MATERIALS

Reimer Emeis, Pretzfeld, Germany, assignor to Siemens-Schuckertwerke Aktiengesellschaft, Berlin-Siemensstadt, Germany, a German corporation Application June 23, 1955, Serial No. 517,414

Claims priority, application Germany June 30, 1954

10 Claims. (Cl. 25—157)

My invention relates to the production of sintered bodies of high purity from pulverulent crystalline material, and in a more particular aspect to methods and means for producing pure bodies of semiconducting material.

In the production of rectifiers, transistors, thermistors, photocells and similar electrical components from semiconducting material, it is often desirable to first mold the raw material, usually obtained from a chemical purifying process in comminuted, namely pulverulent or granular form, into a shaped, particularly rod-shaped body which can subsequently be subjected to further processing by heat treatment preferably without the use of a crucible, such as in the so-called zone-drawing process, and with the rod preferably held in vertical position. In most cases, the molding of the bodies or rods is effected with the aid of a sintering method which does not require subjecting the body to a temperature as high as occurring during the subsequent zone-melting process. For thus preparing the molded bodies, it has been necessary to compress the finely ground raw material, sometimes in mixture with an additional binder, and then heat the pressed composition in an oven. The presence of the binder material and the unavoidable contamination of the composition by the press hold, however, resulted in undesired impurity of the sintered product. Moreover, the sintered body can also take up impurities through reaction with the support on which it rests while in the oven. Finally, sintering by the known process requires several fabricating steps.

It is an object of my invention to overcome the above-described disadvantages of the known processes and to simplify the process by reducing the number of fabricating steps required.

To this end, and in accordance with a feature of my invention, I prepare a sintered body directly from the raw material by filling a heat-resistant non-conducting container with a powder of the raw material, for example silicon powder, without any added binding material, enclose the filled container in a protective atmosphere, namely in vacuum or inert gas, and then heat the material electrically in the container to the fusion temperature of the material so that the powder granules become welded to one another at the places of mutual contact. A quartz tube closed at the bottom is preferably used as the nonconducting container. The quartz tube is so little heated by the sintering process that no reaction takes place with the contained powder. In this manner, the use of a special press mold is obviated and a simplification and shortening of the process is achieved.

The invention will be further described in connection with the accompanying drawing showing a vertical view, partially in cross-section, of an apparatus suitable for the method of the invention.

As illustrated in the drawing, a quartz tube is used as a holder or container. The quartz tube is longitudinally divided into halves designated by 2 and 3. The two halves are held together by fusing at a few spots along their juncture seam. Upon completion of the sintering process, the sintered body, for instance of silicon, can readily be removed from the quartz container without damage simply by breaking the fusion points. The quartz tube 2, 3 filled with silicon powder 4 is contained in an outer quartz tube 5 having both ends sealed by caps 6 and 7. The lower cap 7 of the enclosure is provided with a nipple 8 for the purpose of evacuating the tube 5, or filling the tube with an inert gas. The whole assembly rests upon a base plate 16 provided with elevating feet 16a.

Mounted on the base plate 16 is a guiding standard along which a sliding carriage 10 can be moved up and down by means of a threaded spindle 12. The spindle 12 is driven by a motor 15 through a speed reduction gear 14. The speed reduction preferably is such that the carriage 10 moves up or down along the spindle 12 at a velocity in the order of 1 to 10 millimeters per minute.

For producing the necessary heat, a tubular heating coil 9 is fixed to the carriage 10. The coil 9, preferably of copper tubing, is energized by high-frequency current of several megacycles per second and is traversed by cooling water when in operation. Terminals 11 at the ends of the heating coil 9 serve to connect the source of high-frequency voltage.

For initiating the melting process, a portion of the pulverized material must first be pre-heated. For this purpose a stub 17, melted of the same material as the powder 4, is stuck into the upper end of the powder mass. The stub 17, for example, may have such a degree of impurity that it will be heated directly from room temperature by the high-frequency electric field. It is then only necessary to move the carriage 10 with the heating coil 9 upwardly to the vicinity of the stub 17, in order to raise the stub to glowing temperature, and then gradually to move the heating apparatus downwardly and with it the incandescent zone which causes the granules to bake together. The sintered rod thus produced can be removed from the quartz tube by separating the two halves 2 and 3; and the stub 17 together with the neighboring part of the sintered body can then preferably be removed, for instance by breaking it off.

If, instead of using a contaminated stub 17, one of very high purity is used, it also must first be heated. This can be done, for example, with the use of a separate radiant heating member 18 in the form of a ring of molybdenum, tungsten or a similar material, which extends above the quartz tube 2, 3 and surrounds the outwardly projecting portion of the stub 17. The ring 18 can be supported, for example, by a pair of tungsten wire brackets 19, or the like, extending above the upper end of the quartz tube 2, 3 and held by means of a split-ring spring 20, preferably also of tungsten, clamped upon the upper end of the tube. If now the heating coil 9 is moved to the vicinity of the ring 18, the ring will be heated to glowing temperature, whereupon the stub 17 will be heated by radiation until it becomes electrically conducting enough so that it can be heated directly by the high frequency current. Thereupon the procedure is continued as described above.

For example, a good result was obtained by processing silicon powder in the manner described above, wherein a quartz tube containing the powder had an inside diameter of 12 mm. and a length of 250 mm. By feeding the heating coil with a high-frequency current of four megacycles per second an incandescent zone of about 1000 degrees centigrade was produced and moved longitudinally through the powder mass the heater traveling downward at a speed of about 8 mm. per minute. Moreover, at the points where the single powder granules get into touch such a current density was established that the spots concerned of the silicon granules were heated up to the fusion temperature of about 1460 degrees centigrade and the granules there were welded to one another. As stated above, the resulting rod-shaped body can subsequently be subjected to further processing by heat treatment without the use of a crucible, such as in the so-called zone-melting or zone-drawing process, with the rod preferably held in vertical position.

The term "zone melting" has a well defined meaning. It is defined in Pfann U.S. Patent 2,739,088, in Journal of Metals, pages 747–753, July 1952, and in Physical Review, March 1953, pages 322–333. In zone melting an ingot of the semiconductor is melted and the molten region caused to travel slowly from one end of the ingot to the other. The impurities generally remain in the liquid phase and are swept along with the molten zone. Crucible-free, vertical rod, zone melting is described in my copending U.S. application Serial No. 409,610, filed February 11, 1954, and a related process is described in the Keck et al. reports in Physical Review, vol. 59, 1953, page 1297, and Journal of Applied Physics, vol. 24, 1953, pages 1479–1481. Because of the high melting point and the chemical activity of silicon a suitable crucible is difficult to devise. Crucible-free zone melting of silicon solves the problem, since the molten zone of the silicon makes no contact wtih any apparatus elements. The present invention is needed, in order to provide the sintered silicon rod or body. The two steps cooperate, in that the sintered body is prepared here by a process which introduces a minimum of foreign substances. This materially assists the subsequent crucible-free zone melting purification step.

My copending application describes a process of successively zone melting and resolidifying an elongated body of semiconductor material, such as silicon, comprising supporting the body at both ends in a vertical position, applying heat to establish a molten zone extending through the cross-section of the body, the length of the zone being limited, the molten material forming a drop which is prevented from escaping principally by virtue of cohesive and adhesive forces, and displacing said molten body in an axial direction along said body. The process is preferably under high vacuum. The vertical body requires no crucible for support, so that there is no contact of the molten drop of semiconductor with apparatus elements. The heating is by means making no contact with the semiconductor, particularly with the molten region. A ring-shaped strip of tungsten is moved longitudinally along and spaced from the silicon rod. The tungsten strip is a resistance element heated by passage of current therethrough. The strip heats the silicon by heat radiation.

While the described process is especially suitable for manufacturing semiconductor materials of a very high melting temperature such as silicon, it is also advantageously applicable to the processing of other crystalline materials. For instance, the method and apparatus are applicable to the processing of germanium and the binary compounds of elements from the third and fifth group of the periodic system: InAs, InP, InSb, GaP, AlP, AlSb and others. Crystalline bodies, particularly monocrystals, of such materials are applicable for the various electric semiconductor purposes as well as for the production of optical components such as lenses, prisms or filters.

It is understood that the terms "protective or inert atmosphere" are employed here in the generic sense defined above, including thereby use of vacuum or gas inert in the process.

It will be obvious to those skilled in the art, upon a study of the disclosure, that my invention permits of various changes and modifications and may be embodied by means other than that specifically illustrated, without departing from the objects and essence of the invention and within the scope of the claims annexed hereto.

I claim:

1. The process of producing a chemically pure sintered silicon body from granular silicon material, comprising charging a quartz vessel with the granular silicon material, without binding agent, electro-inductively heating the granular material in the vessel in an atmosphere inert to the silicon, said heating being by inducing electric currents in said silicon and being to an over-all temperature below the melting point of the silicon material, the heating being to an extent such that the granules are fused to one another substantially only at mutual points of contact, the current density at said points of contact being such that the silicon granules are heated at said points to the silicon fusion temperature, the silicon granules as they are being welded having no contact with material other than the silicon, except for the quartz container, the quartz vessel remaining relatively cooler than the silicon, whereby they are readily separated.

2. The process of forming a sintered elongated body of chemically pure silicon material, which comprises charging an elongated quartz vessel with granular silicon, without binding agent, and then heating the silicon electro-inductively, by current induced in said silicon material, in an atmosphere inert to silicon, to an over-all temperature below the melting point of the silicon material, until the granules become welded to one another at mutual points of contact to form the sintered body, the current density at said points of contact being such that the silicon granules are heated at said points to the silicon fusion temperature, the heating being in a narrow zone brought to glowing temperature, the glowing zone being caused to travel along the body, the quartz vessel remaining relatively cooler than said zone, whereby the vessel and silicon are readily separable at the end of the sintering process.

3. The method of producing a sintered body from granular crystalline semiconductor material, which comprises charging an elongated vessel of electrically substantially non-conducting, heat-resistant substance with the granular material, without binding agent, the semiconductor material having no contact with material other than the semiconductor material, except for the vessel, during the sintering, heating a zone of said material within said vessel by electrical induction of current within said material, so that the material granules fuse together at points of mutual contact in said zone, the current density at said points of contact being such that the granules are heated at said points to fusion temperature, and then gradually moving said heated zone along said vessel through the rest of said contained material, the over-all heating temperature of the zone being below the melting point of said material.

4. The method of producing elongated sintered bodies from granular crystalline semiconductor material, which comprises charging an elongated, electrically substantially non-conducting, heat-resistant vessel with the granular material, without binding agent, enveloping said charged material in an atmosphere inert to said material, heating a zone at one end region of said vessel by electrical induction of current within said material, so that the granules become welded to one another at points of contact in said zone, the current density at said points of contact being such that the granules are heated at said points to fusion temperature, and then gradually moving said so electroinductively heated zone toward the other end region of the charge in said vessel, the over-all heating temperature of the zone being at a temperature below the melting point of the semiconductor material.

5. The method of producing elongated sintered bodies from granular crystalline semiconductor material, which comprises filling an elongated, electrically substantially non-conducting, heat-resistant container with the granular material, without binding agent, the said contained material being in an atmosphere inert thereto, preheating a zone of said material at one end in said container by conduction from a stub predominantly composed of the same semiconductor material inserted therein at said end of the chamber and heated by electrical induction, said stub of material having a higher impurity content than the material to be sintered, further heating said preheated zone of material, by electrical induction of current within said zone of material, to a temperature sufficient to weld mutually contacting points of the granules of said material, and then gradually moving the said electroinductive heating of said heated zone through said contained material, the zone being heated to an over-all temperature below the melting point of the contained material, the current density at said points of contact being such that the granules are heated at said points to fusion temperature.

6. The method of producing elongated sintered bodies from granular crystalline semiconductor material, which comprises charging an elongated, non-conducting, heat-resistant vessel with the granular material, without binding agent, said charged material being in an atmosphere inert thereto, preheating a zone of said material at one end in said vessel by a stub of the material inserted therein at said end of the vessel and heated by heat radiation, further heating said preheated zone of material by electrical induction of current within said material, to a temperature sufficient to well mutually contacting points of the granules of said material and then gradually moving the heating of said heated zone through the rest of said charged material, the zone being heated to an over-all temperature below the melting point of the charged material, the current density at said points of contact being such that the granules are heated at said points to fusion temperature.

7. The process of producing a chemically pure silicon semiconductor body from granular silicon material, which comprises charging a quartz tube with the granular silicon material, without binding agent, and then electroinductively heating a transverse zone of the material in the tube in an atmosphere inert to the silicon, the heating being by electric currents induced in the silicon and being to an over-all temperature below the melting point of the silicon material, until the granules become welded to one another at mutual points of contact, and gradually moving said electroinductively heated zone longitudinally in said material in the tube, the current density at said points of contact being such that the silicon granules are heated at said point to the silicon fusion temperature, the silicon granules as they are being welded having no contact with material other than the silicon, except for the quartz, the quartz tube remaining relatively cooler than the silicon, whereby they are readily separated, thereafter further purifying the silicon body by a crucible-free zone melting process, comprising supporting the sintered body at opposite end portions in an upwardly-downwardly extending position, applying heat to establish a transverse narrow molten zone in said body, and displacing said zone in an axial direction along the body.

8. The method of producing a chemically pure semiconductor body from granular semiconductor material, comprising charging an electrically substantially non-conducting, heat-resistant container with the granular material to form said body, without binding agent, said material being in an atmosphere non-reactive thereto, and then heating said material by inductively induced electrical current flowing in the body to an over-all temperature below the melting point, the heating being only to an extent such that the granules become welded to one another substantially at points of contact only, and gradually moving said electroinductively heated zone longitudinally in said material in the tube, the current density at said points of contact being such that the semiconductor granules are heated at said points to the fusion temperature, the semiconductor granules having, when they are being welded, no contact with material other than the semiconductor material, except for the container, during the sintering, separating the container from the semiconductor body, thereafter purifying the semiconductor body by a crucible-free zone melting process, comprising supporting the body at opposed end regions in an upwardly-downwardly extending position, applying heat to establish a transverse molten zone in said body, and displacing said zone axially along the body.

9. The process of producing a chemically pure semiconductor material, comprising charging a heat-resistant electrically non-conducting container with granular semiconductor material, without binding agent, heating the material in the container in an atmosphere inert to the semiconductor material, to an over-all temperature below the melting point of the material by electroinductively induced electric current flowing in said material, the said heating being only to such an extent that the granules are fused together merely at mutual points of contact, and gradually moving said electroinductively heated zone longitudinally in said material in the tube, the current density at said points of contact being such that the granules are heated at said points to fusion temperature, removing the resulting sintered body from the container, thereafter purifying the semiconductor body by a crucible-free zone melting process, comprising supporting the body at opposed end regions in an upwardly-downwardly extending position, applying heat to establish a transverse molten zone in said body, and displacing said zone axially along the body.

10. The method of producing sintered bodies from granular crystalline silicon semiconductor material, which comprises charging an electrically substantially non-conducting, heat-resistant vessel with the granular semiconductor material to form said body, without binding agent, said material being in an atmosphere non-reactive thereto, and then heating said material by electroinductively induced electrical current flowing in the body to an over-all temperature below the melting point and to such an extent that the granules become welded to one another substantially solely at points of contact, and gradually moving said electroinductively heated zone longitudinally in said material in the tube, the current density at said points of contact being such that the granules are heated at said points to the fusion temperature, the semiconductor granules having, as they are being welded, no contact with material other than the semiconductor material, except for the said vessel, during the sintering, said vessel being a longitudinally divided quartz tube temporarily bonded along the line of division, the tube being separated along the line of division after the sintering operation.

References Cited in the file of this patent

UNITED STATES PATENTS

| | | |
|---|---|---|
| 1,301,714 | Kueppers | Apr. 22, 1919 |
| 1,549,591 | McCullough | Aug. 11, 1925 |
| 1,794,863 | Northrup | Mar. 3, 1931 |
| 2,112,777 | Hauser | Mar. 29, 1938 |
| 2,402,582 | Scaff | June 25, 1946 |
| 2,555,450 | Lee | June 5, 1951 |
| 2,637,091 | Nicholson | May 5, 1953 |
| 2,737,456 | Haller | Mar. 6, 1956 |
| 2,739,088 | Pfann | Mar. 20, 1956 |
| 2,747,971 | Hein | May 29, 1956 |

OTHER REFERENCES

Keck et al., pp. 331–334 of "The Review of Scientific Instruments," vol. 25, No. 4, April 1954.